(12) United States Patent
Ozawa

(10) Patent No.: US 6,449,450 B1
(45) Date of Patent: Sep. 10, 2002

(54) IMAGE FORMING APPARATUS

(75) Inventor: Kazuyuki Ozawa, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/779,641

(22) Filed: Feb. 9, 2001

(51) Int. Cl.[7] .......................... G03G 15/00; G03G 15/04
(52) U.S. Cl. .......................................... 399/177; 399/82
(58) Field of Search .............................. 399/38, 51, 82, 399/85, 177, 202, 211, 361, 363, 365; 358/474, 496, 497

(56) References Cited

U.S. PATENT DOCUMENTS 6,226,473 B1 * 5/2001 Kutsuwada .................. 399/82

FOREIGN PATENT DOCUMENTS

| JP | 63-125931 | * 5/1988 |
| JP | 6-143688 | 5/1994 |

* cited by examiner

Primary Examiner—Sophia S. Chen
(74) Attorney, Agent, or Firm—Foley & Lardner

(57) ABSTRACT

In a normal print mode in which the image of an original document D is printed on a copying paper with the image of the original document not reversed, the direction of sub-scanning executed by a read section is set to a normal direction (regular direction X). In a mirror image print mode in which the image of an original document D set on a document table is printed on a copying paper with the image of the original document reversed, the direction of the sub-scanning executed by the read section is switched to a direction (reverse direction X') opposite to the normal direction.

15 Claims, 15 Drawing Sheets

| SCCLK -0 | H.OFF -1 | CW/CCW | DATA 3 | DATA 2 | DATA 1 | DATA 0 | OPERATION | |
|---|---|---|---|---|---|---|---|---|
| H | H | — | — | — | — | — | MAGNETIC EXCITATION OFF | |
| H | L | * | * | * | * | * | MAGNETIC EXCITATION ON | |
| * | | L | * | * | * | * | REGULAR ROTATION | |
| * | | H | * | * | * | * | REVERSE ROTATION | |
| | | | H | H | H | H | | (250 DIVISION) 0.00288° |
| | | | H | H | H | L | | (200 DIVISION) 0.00360° |
| | | | H | H | L | H | | (125 DIVISION) 0.00576° |
| | | | H | H | L | L | | (100 DIVISION) 0.00720° |
| | | | H | L | H | H | | (80 DIVISION) 0.0090° |
| | | | H | L | H | L | | (50 DIVISION) 0.0144° |
| | | | H | L | L | H | | (40 DIVISION) 0.0180° |
| | | | H | L | L | L | | (25 DIVISION) 0.0288° |
| | | | L | H | H | H | | (20 DIVISION) 0.036° |
| | | | L | H | H | L | | (10 DIVISION) 0.072° |
| | | | L | H | L | H | | MAGNETIC EXCITATION SYSTEM D (8 DIVISION) 0.090° |
| | | | L | H | L | L | | (5 DIVISION) 0.144° |
| | | | L | L | H | H | | (4 DIVISION) 0.180° |
| | | | L | L | H | L | | MAGNETIC EXCITATION SYSTEM C (2.5 DIVISION) 0.288° |
| | | | L | L | L | H | | MAGNETIC EXCITATION SYSTEM B (2 DIVISION) 0.36° |
| | | | L | L | L | L | | MAGNETIC EXCITATION SYSTEM A (1 DIVISION) 0.72° |

FIG. 7

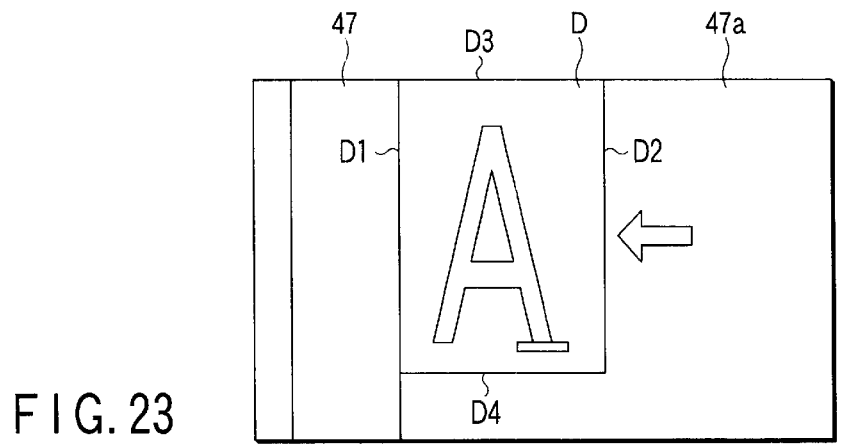
FIG. 23
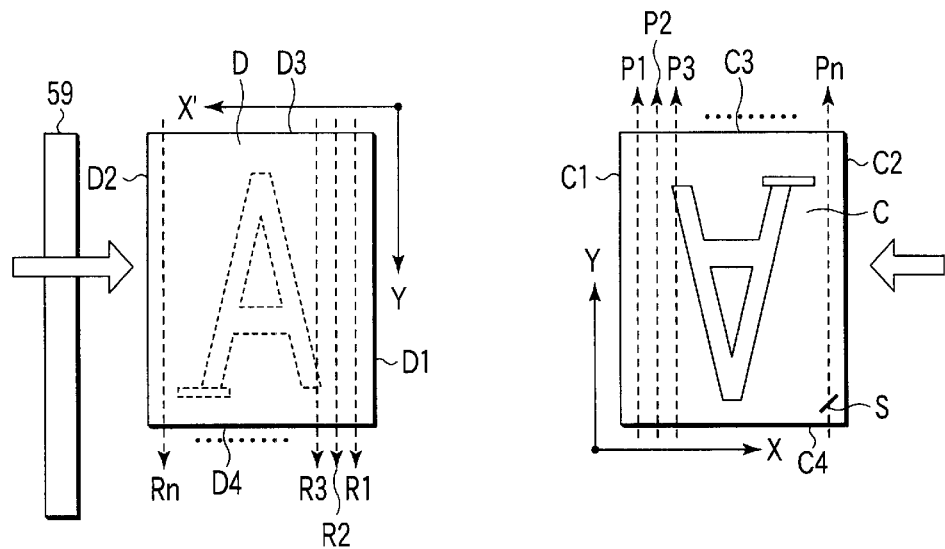
FIG. 24
FIG. 26
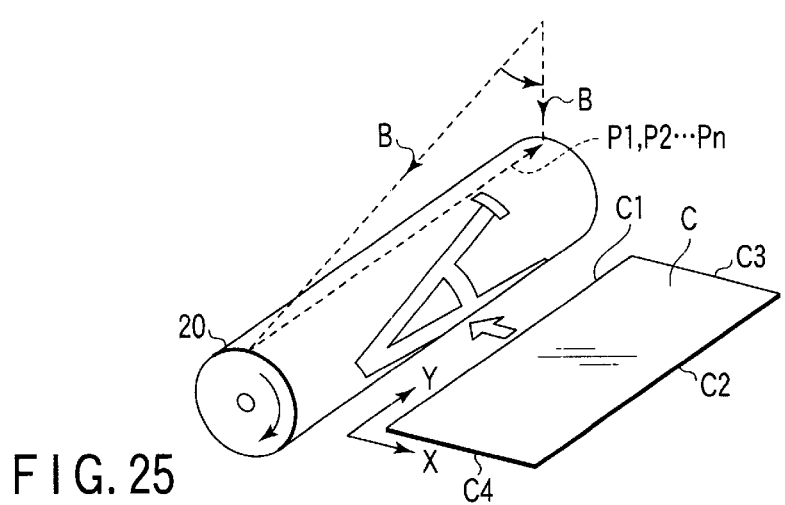
FIG. 25

IMAGE FORMING APPARATUS

BACKGROUND OF THE INVENTION

In an image forming apparatus such as a copying machine or the like, an exposure means is reciprocally moved along a document table by operation of a scanning motor, and the document table is subjected to exposure and scanning thereby to read an image on an original document, while it reciprocally moves. The image thus read is formed on a copying paper as an image forming medium. A pulse motor is used as the scanning motor.

The exposure means comprises, as its components, a carriage where an exposure lamp and a carriage on which the exposure lamp is mounted. The carriage is provided to be reciprocally movable along the document table, and is connected to the shaft of the scanning motor through a motion transmission mechanism such as a belt, wire, or the like. The carriage receives the motion force from the scanning motor and reciprocally moves.

An image forming apparatuses of this kind has a function of a mirror image print mode in which the image of an original document is printed as a mirror image which is reversed from the image of the original document. In printing of this mirror image print mode, an image read from an original document is reversed with use of a memory, and the reversed image which is a mirror image is printed on a copying paper.

That is, a memory for reversing the image and an image processing function for reversing the image are required to carry out printing in the mirror image print mode. An image forming apparatus of a low cost, which cannot equipped with the memory and image processing function, cannot carry out printing in the mirror image print mode.

BRIEF SUMMARY OF THE INVENTION

The present invention has an object of providing an image forming apparatus and method of controlling the apparatus which are capable of printing an image of an original document as a reversed image thereof, i.e., a so-called mirror image, without requiring costs.

An image forming apparatus according to the present invention comprises: a document table on which an original document is set; read means for reading an image of the original document set on the document table, by optical main scanning on the original document set on the original table, in one direction, and sub-scanning in which the mains scanning is shifted in a direction perpendicular to the one direction; a printer section for executing main scanning and sub-scanning in synchronization with the main scanning and the sub-scanning performed by the read means, thereby to print the image read by the read means, onto an image forming medium; and control means for setting the direction of the sub-scanning of the read means to a normal direction, in case of a normal print mode in which the image of the original document set on the document table is printed on the image forming medium, with the image not reversed, and for setting the direction of the sub-scanning to a direction opposite to the normal direction, in case of a mirror image print mode in which the image of the original document set on the original table is printed on the image forming medium, with the image reversed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing selection conditions of a magnetic excitation system of the scanning motor in the first embodiment;

FIG. 23 is a view showing a state in which the original document shown in.FIG. 10 is set on the automatic document feeder;

FIG. 24 is a view showing a state in which the original document shown in FIG. 23 is fed to the document read window and passes over the document read window, and main scanning and sub-scanning for reading image from the original document;

FIG. 25 is a view showing the image read in FIG. 24 is printed on a copying paper by a laser beam and a photosensitive drum in case of a mirror image print mode;

FIG. 26 is a view showing a state in which an image is printed on a copying paper shown in FIG. 25, and main scanning and sub-scanning of the printing;

DETAILED DESCRIPTION OF THE INVENTION

[1] In the following, the first embodiment of the present invention will be explained with reference to the drawings.

Figure 1:
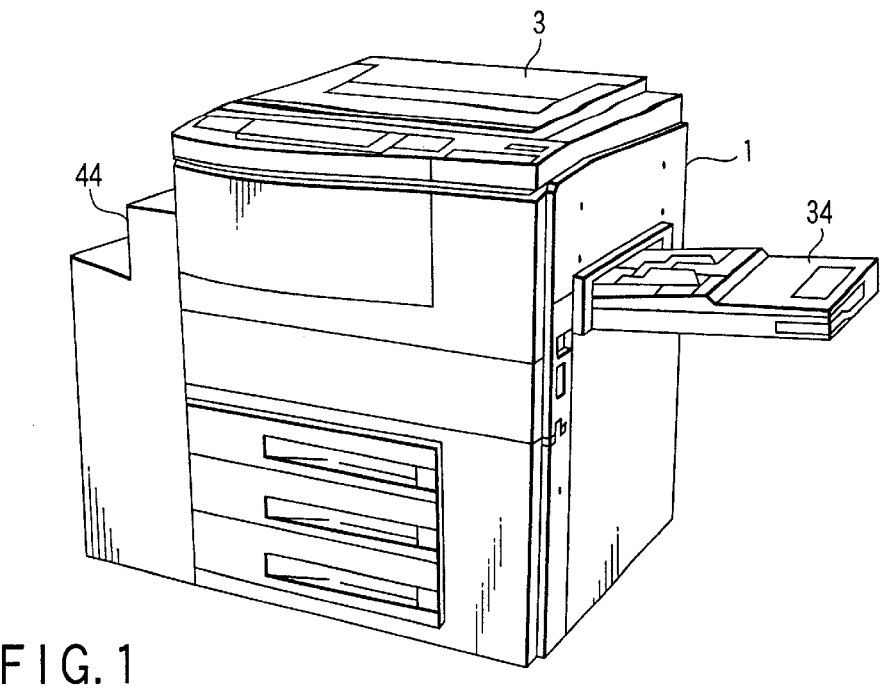
FIG. 1 is a view showing an outer appearance of the first embodiment.
Figure 2:
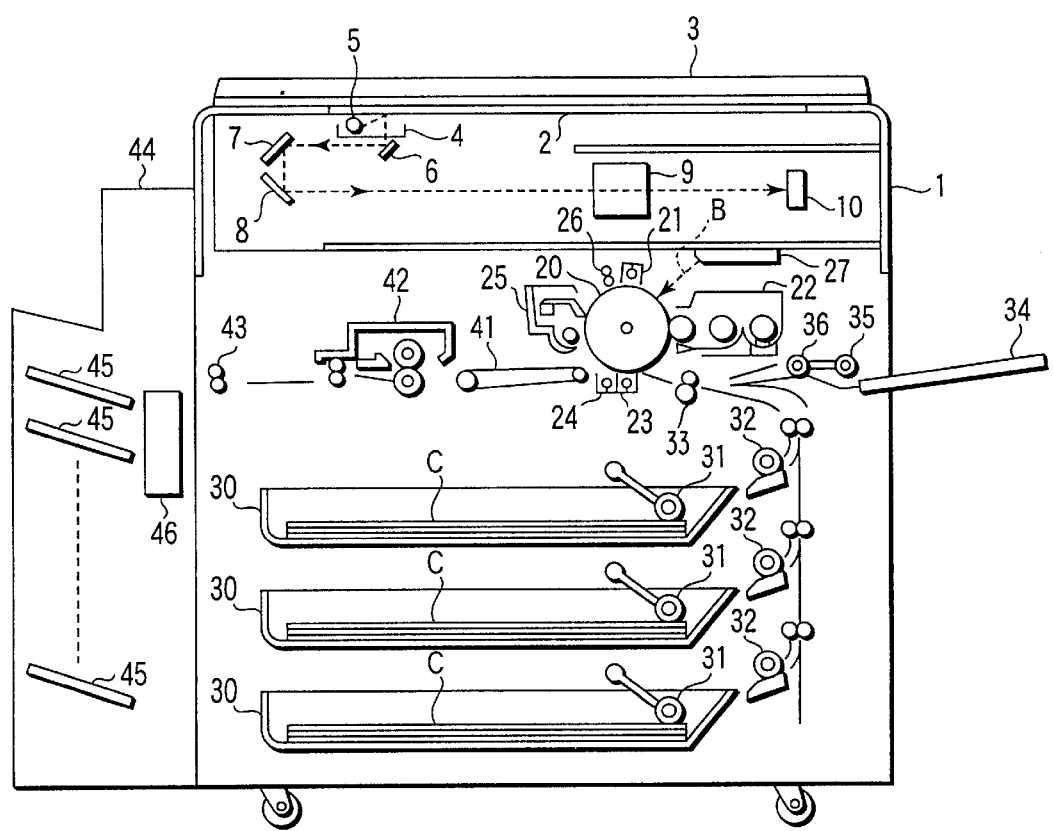
FIG. 2 is a view showing the internal structure of the first embodiment.

As shown in FIG. 1 and FIG. 2, a transparent document table (glass plate) 2 for setting an original document is provided at an upper part of the body 1, and a cover 3 is provided to be freely openable/closable over the document table 2.

Figure 3:
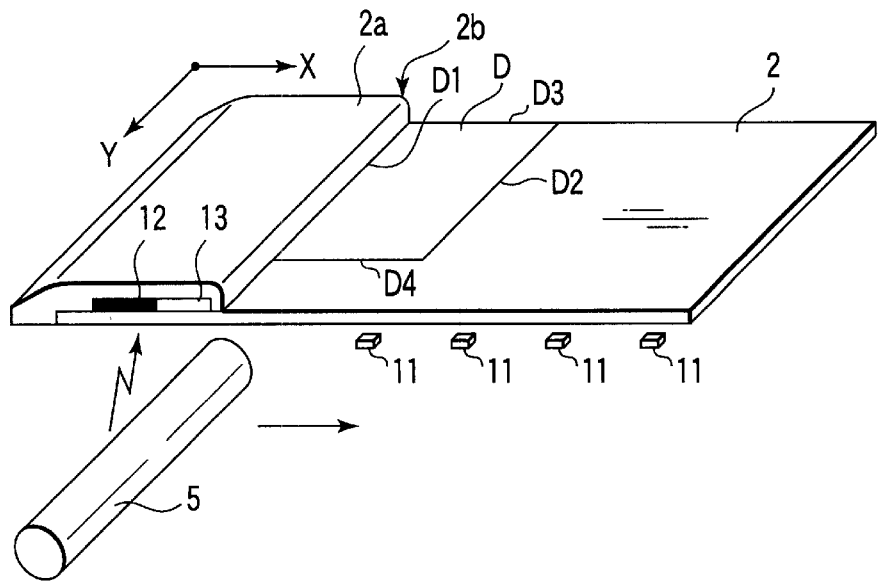
FIG. 3 is a view showing the structure of a document table and its periphery in the first embodiment.

As shown in FIG. 3, an indicator part 2a is provided at an end part of the document table 2. A gap part between the indicator part 2a and the document table 2 serves as a reference position 2b. An original document D is set aligned with the reference position 2b. That is, the side of the indicator part 2a (left side in the figure) with respect to the reference position 2b as a boundary is a non-document set area, and the other side (right side in the figure) is a document set area.

A carriage 4 is provided in the lower surface side of the document table 2, and an exposure lamp 5 is provided on the carriage 4. An exposure means is constructed by the carriage 4 and the exposure lamp 5. The carriage 4 can reciprocally move along the lower surface of the document table 2. The lower surface side of the indicator part 2a and the original document D on the document table 2 are exposed as the exposure lamp 5 is lightened while the carriage 4 reciprocally moves from the non-document set area to the document set area.

By this exposure, a reflection light image of the original document D set on the document table 2 is obtained, and it is projected on an image signal output means such as a CCD (Charge Coupled Device) 10 by reflection mirrors 6, 7, and 8, and a magnification change lens block 9. The CCD 10 has a large number of photoelectric conversion elements in a light receiving area. The light receiving area is subjected to line-scanning, and an image signal is outputted by repeating the line-scanning.

Figure 19:
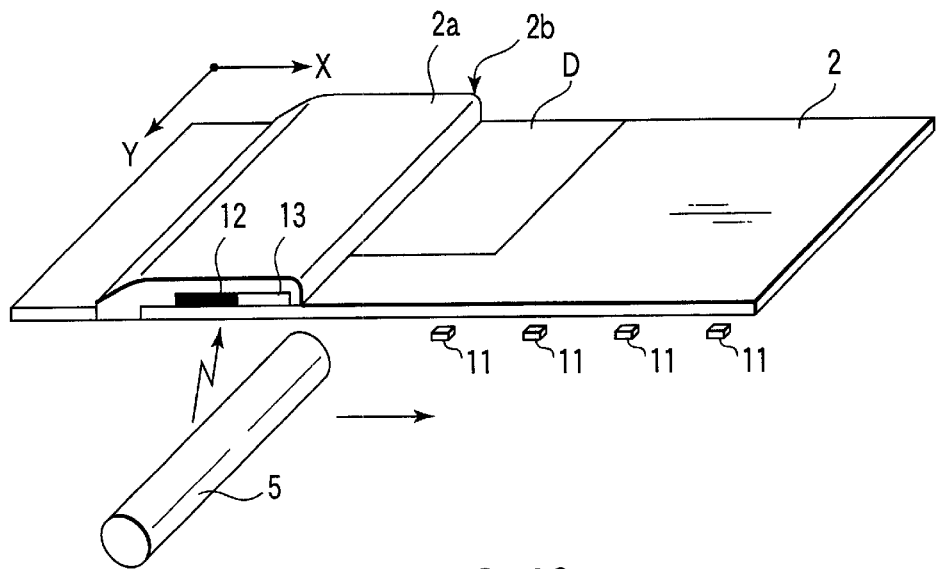
FIG. 19 is a view showing the structure of the document table and its periphery in the second embodiment.
Figure 20:
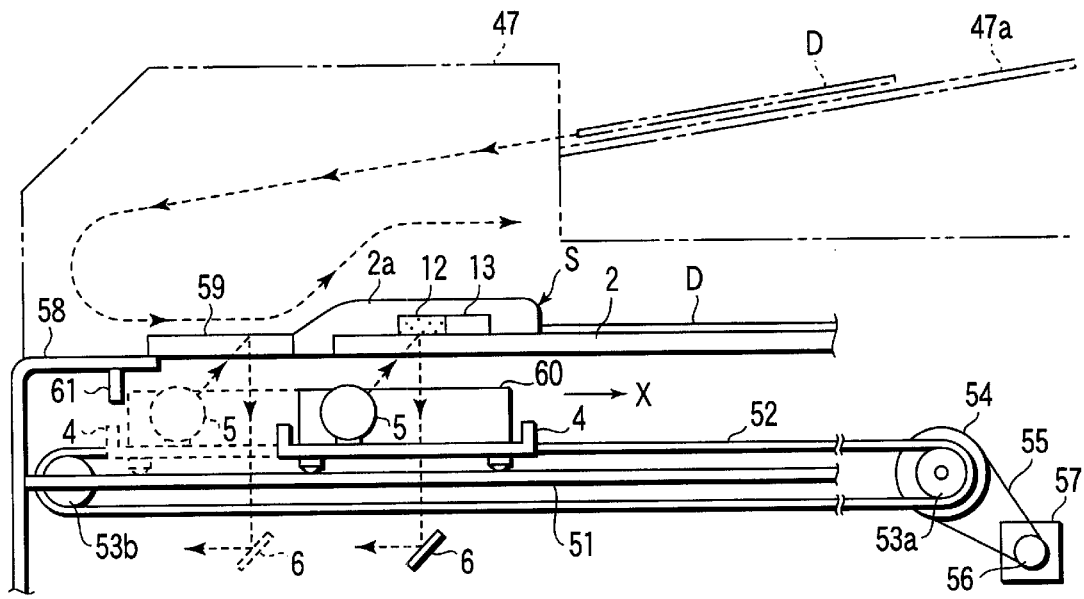
FIG. 20 is a view showing the structure of an exposure lamp and its periphery in the second embodiment.

The carriage 4, exposure lamp 5, reflection mirrors 6, 7, and 8, magnification change lens block 9, and CCD 10 construct a read means capable of optically reading an original document D set on the document table 2. That is, an original document D set on the document table 2 is subjected to optical main scanning in one direction by this read means, and the main scanning is repeated as the reciprocal motion of the exposure lamp 5. Repetition of the main scanning in accordance with the reciprocal motion of the exposure lamp 5 is called sub-scanning. FIG. 19 shows the directions of the main scanning and the sub-scanning as X and Y, respectively.

The image signal outputted from the CCD 10 is amplified and converted into a digital signal. The digital signal is processed appropriately by the image processing section and is thereafter supplied to a laser unit 27. The laser Unit 27 emits a laser beam B in accordance with the input signal.

In the lower surface side of the indicator part 2a as a non-document-set area, a black reference plate 12 and a white reference plate 13 as color reference members for shading correction are arranged orderly along the motion direction of the exposure lamp 5. Both reference plates have a dimensional shape corresponding to the length of the indicator part 2a in its lengthwise direction.

A plurality of document sensors 11 are provided in the lower surface side of the document table 2. Presence or absence of an original document D and the size thereof are detected optically by these sensors.

Figure 4:
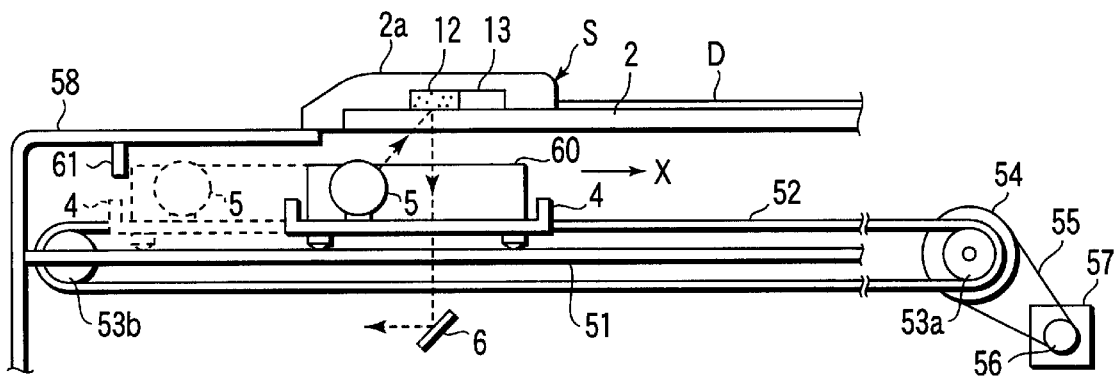
FIG. 4 is a view showing the structure of an exposure lamp and its periphery in the first embodiment.

As shown in FIG. 4, the carriage 4 is movably mounted on a rail 51. Further, a wire 52 is connected to the carrier 4, and the wire 52 is hung between a drive pulley 53a and a slave pulley 53b. The drive pulley is connected to a deceleration pulley 54, and the deceleration pulley 54 is connected to a pulley 56 of the scanning motor 57 through a timing belt 55. A pulse motor is used as the scanning motor 57. Moving position of the carriage 4 is managed by the number of drive voltage pulses supplied to the scanning motor 57 (e.g., the number of steps.).

The outer peripheral surface of the body 1 is formed by a cover 58. A reference position switch 61 is provided inside this cover 58. The reference position switch 61 has a slit for receiving insertion of a light shielding plate attached to the carriage 4, and optically detects whether or not the light shielding plate 60 enters in the slit. If the light shielding plate enters, the reference position switch is turned on. Otherwise, it is turned off. When the reference position switch 61 is turned on, it is determined that the carriage 4 exists at a predetermined reference position.

The scanning section is constructed by the structure described above from the document table 2 to the reference position switch 61.

Meanwhile, a photosensitive drum 20 is provided to be rotatable at the substantial center part in the body 1. An electrostatic charger 21, a developing device 22, a transfer device 23, a separator 24, a cleaner 25, and a discharger 26 are orderly provided around the photosensitive drum 20. Further, a laser beam B emitted from the laser unit 27 described above is irradiated on the surface of the photosensitive drum 20 through a space between the electrostatic charger 21 and the developing device 22.

At a bottom part of the body 1, a plurality of paper feed cassettes 30 are provided. These cassettes 30 contain a large number of copying papers C of sizes which are respectively different from each other of the cassettes. In response to an ON-operation on a print key 83 described later, copying papers are taken out one after another from any one of the paper feed cassettes 30. To take out papers, each paper feed cassette 30 is provided with a pick-up roller 31. A picked-up copying paper C is separated by separator 32 from the paper feed cassette 30 and is fed to a resist roller 33. The resist roller 33 feeds the copying paper C to between the photosensitive drum 20 and the transfer device 23 at timing in consideration of the rotation of the photosensitive drum 20. Meanwhile paper feed tray 34 is provided at a side part of the body 1. A copy paper C loaded in the paper feed tray 34 is fed to the body 1 by a pick-up roller 35. The copying paper C is then fed to the resist roller 33 by a separator 36.

The electrostatic charger 21 applies a high voltage to the photosensitive drum 20, thereby to charge an electrostatic charge on the surface of the photosensitive drum 20. After this electrostatic charging, a laser beam B emitted from the laser unit 27 is irradiated on the surface of the photosensitive drum 20. The laser unit 27 performs main scanning (line scanning) on the surface of the photosensitive drum 20 in one direction, and sub-scanning in which the main scanning is repeated in accordance with rotation of the photosensitive drum 20, thereby to form an electrostatic latent image corresponding to an image read by the scanner section, on the surface of the photosensitive drum 20.

The electrostatic latent image on the photosensitive drum 20 is developed as it receives a developing agent (toner) from the developing device 22. This developed image is transferred to a copying paper C by the transfer device 23. The copying paper to which the developed image has been transferred is separated from the photosensitive drum 20 by the separator 24. The developing agent and charges remain on the surface of the photosensitive drum 20 from which the copying paper C has been separated. The remaining developing agent is removed by the cleaner 25. The remaining charges are removed by the discharger 26.

The copying paper C separated from the photosensitive drum 20 is fed to a fixing device 42 by a conveyer belt 41. The fixing device 42 fixes the transferred image on the copying paper C by heat. The copying paper C on which the image has already been fixed is fed out to a sorter 44 by a feed-out roller 43. The sorter 44 includes a plurality of container parts 45 disposed vertically, and distributes a predetermined number of sheets of printed copying papers to each of the container parts 45. Also, the sorter 44 comprises a staple unit 46 for stapling copying papers contained in each container part 45 for every container part 45.

The printer section is thus constructed by the structure explained above from the photosensitive drum 20 to the sorter 44, in which main scanning and sub-scanning are executed in synchronization with those of the scanner section and the image read by the scanner section is printed on a copying paper C.

Figure 5:
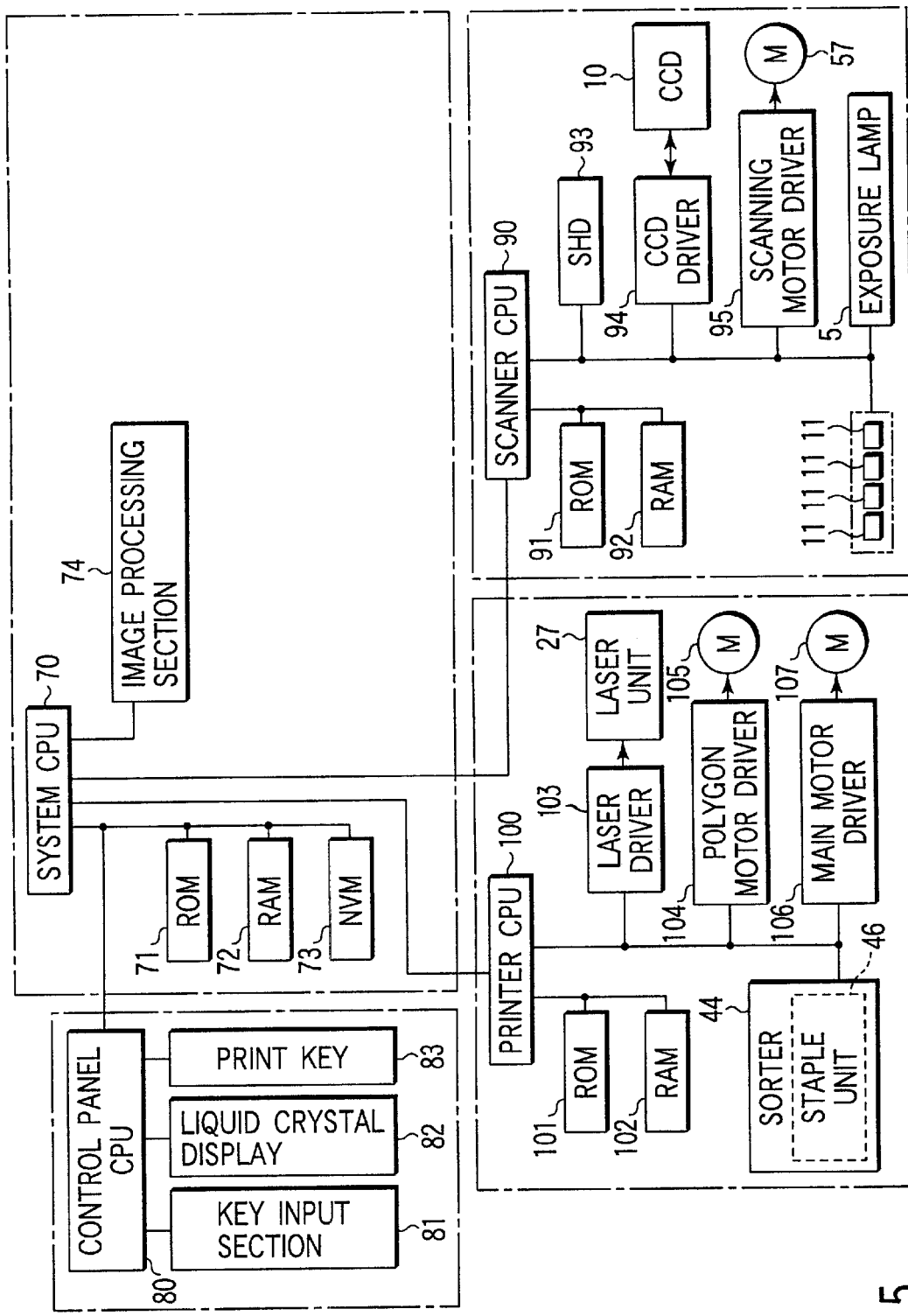
FIG. 5 is a block diagram of a control circuit in the first embodiment.

FIG. 5 shows a total control circuit.

A system CPU 70, a control panel CPU 80, a scanner CPU 90, and a printer CPU 100 are connected to each other. The system CPU 70 totally controls the control panel CPU 80, scanner CPU 90, and the printer CPU 100.

Further, the system CPU 70 is connected with a ROM 71 for storing a control program, a RAM 72 for storing data, a NVM 73, and an image processing section 74.

The control panel CPU 80 is connected with a key input section 81, a liquid crystal display 82, and a print key 83. The key input section 81 has a power switch a document size specification key, a magnification specification key, and the like. The liquid crystal display 82 displays information according to an operation on the key input section 81, and various information to be notified to the user.

The scanner CPU 90 is connected with a ROM 91 for storing program data, a RAM 92 for storing data, a shading correction part (SHD) 93, a CCD driver 94, a scanning motor driver 95, the exposure lamp 5, each of the document sensors 11, and the like. The CCD driver 94 drives the CCD 10. The scanning motor driver 95 drives the scanning motor 57.

The printer CPU 100 is connected with a ROM 101 for storing control programs, a RAM 102 for storing data, a laser driver 103, a polygon motor driver 104, a main motor driver 106, and a sorter 44. The laser driver 103 drives the laser unit 27. The polygon motor driver 104 drives a polygon motor 105 as a drive source of a polygon mirror for scanning the laser beam B with respect to the photosensitive drum 20. The main motor driver 106 drives a main motor 107 as a drive source for the photosensitive drum 20, the paper feed mechanism, and the like.

The system CPU 70 and the scanner CPU 90 include the following control means (1) for their main function.

(1) Control means for setting the sub-scanning direction of the read means to a normal direction (regular direction X) in case of a normal print mode in which an image of an original document set on the document table 2 is printed on a copying paper C without reversing the image, and for switching the sub-scanning direction of the read means to an opposite direction (an opposite direction X') which is opposite to the normal direction in case of a mirror-image print mode in which an image of an original document D set on the document table 2 is printed in a reversed condition, as a so-called mirror image, on a copying paper C.

Figure 6:
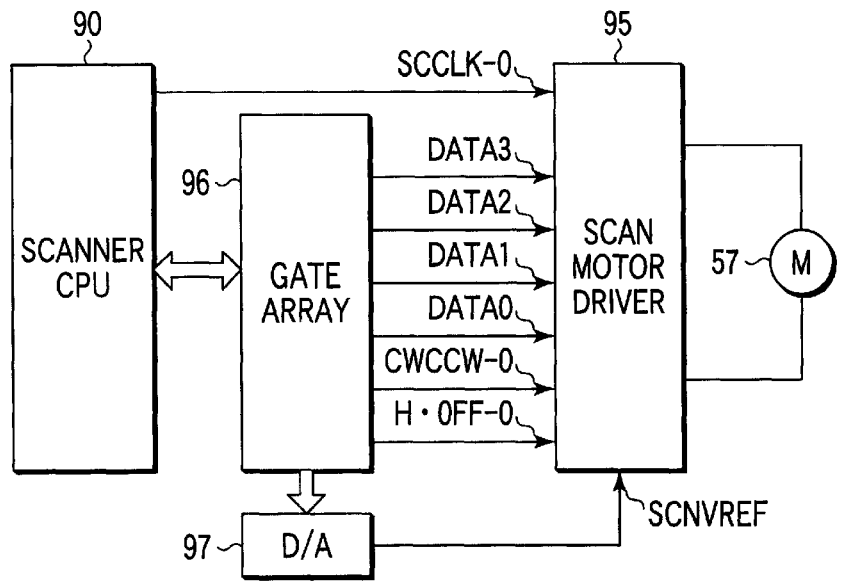
FIG. 6 is a block diagram showing a main part of FIG. 5.

Meanwhile, as shown in FIG. 6, a gate array 96 and a D/A converter 97 are provided between the scanner CPU 90 and the scanning motor driver 95.

The gate array 96 outputs a control signal H.OFF-1 for specifying magnetic excitation ON and OFF of the scanning motor 57, a control signal CWCCW for specifying regular rotation and reversal rotation of the scanning motor 57, and data signals DATA0, DATA1, DATA2, and DATA3 for specifying magnetic excitation systems of the scanning motor 57. These signals are supplied to the scanning motor driver 95. The D/A converter 97 converts current value specification data, which is generated from the scanner CPU 90, into a voltage signal SCNVREFA for specifying a relative current value with respect to the scanning motor 57. This voltage signal SCNVREFA is supplied to the scanning motor driver 95.

Also, a reference clock signal SCCLK-0 is supplied from the scanner CPU 90 to the scanning motor driver 95. The scanning motor driver 95 outputs a drive voltage pulse synchronized with a rise of the reference clock signal SCCLK-0. This drive voltage pulse is supplied to the scanning motor 57. The scanner CPU 90 changes the interval of the reference clock signal SCCLK-0 in accordance with the magnification set by the key input part 81. In accordance with the change, the interval of the drive voltage pulse supplied to the scanning motor 57 is changed so that the rotation speed of the scanning motor 57, i.e., the motion speed of the carriage 4 changes.

FIG. 7 shows selection conditions as to which magnetic excitation system should be selected in correspondence with the 4-bit data signals DATA0, DATA1, DATA2, and DATA3 in case where a five-phase pulse motor is used as the scanning motor 57. In the present embodiment, any of the magnetic excitation systems A, B, C, and D is selected.

Figure 8:
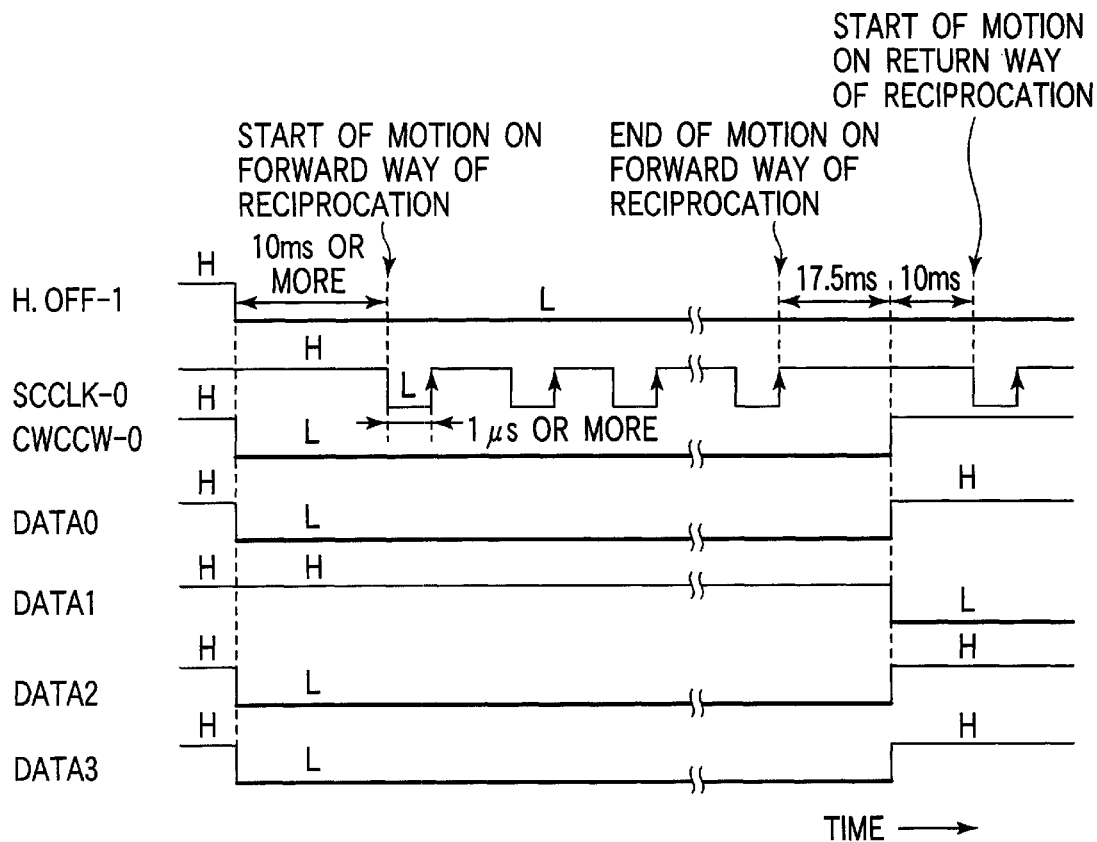
FIG. 8 is a view showing patterns of various signals with respect to the scanning motor in the first embodiment.

FIG. 8 shows an example of patterns of signals concerning the driving of the scanning motor 57. In this example, the magnetic excitation system C is selected.

When the carriage 4 moves forward, the scanning motor 57 firstly accelerates toward an aimed speed, then operates at an equal speed after the aimed speed is reached, and finally decelerates. While the scanning motor is driving at an equal speed, the image on an original document D is read. When the carriage moves back, the scanning motor 57 firstly operates to accelerate, then operates at an equal speed, and finally decelerates. Switching between the acceleration, operation at an equal speed, and deceleration is realized by changing the interval of the reference clock signal SCCLK-0.

Figure 9A:
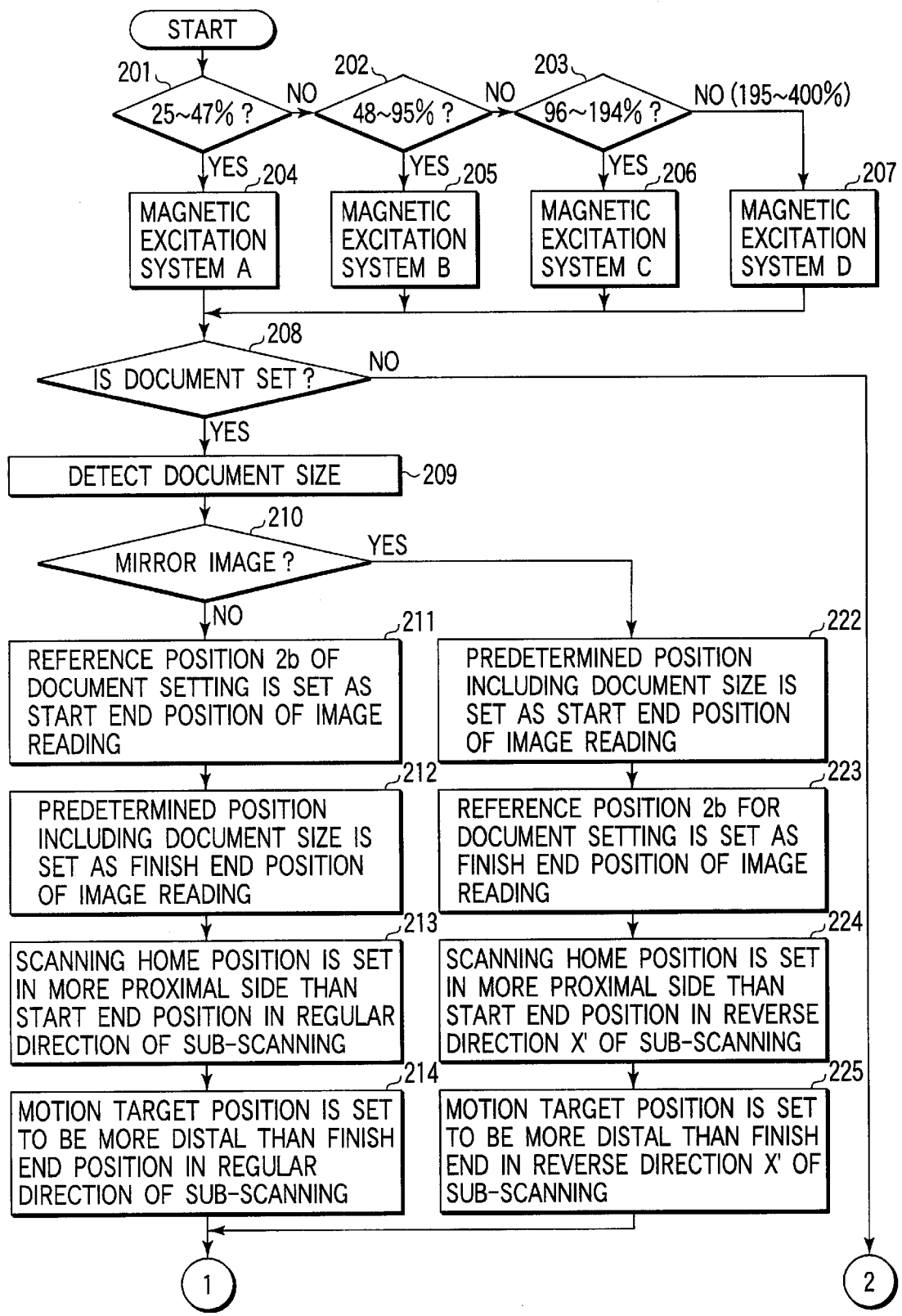
FIG. 9A and FIG. 9B are flowcharts for explaining functions of the document table read systems in the first and second embodiments.
Figure 9B:
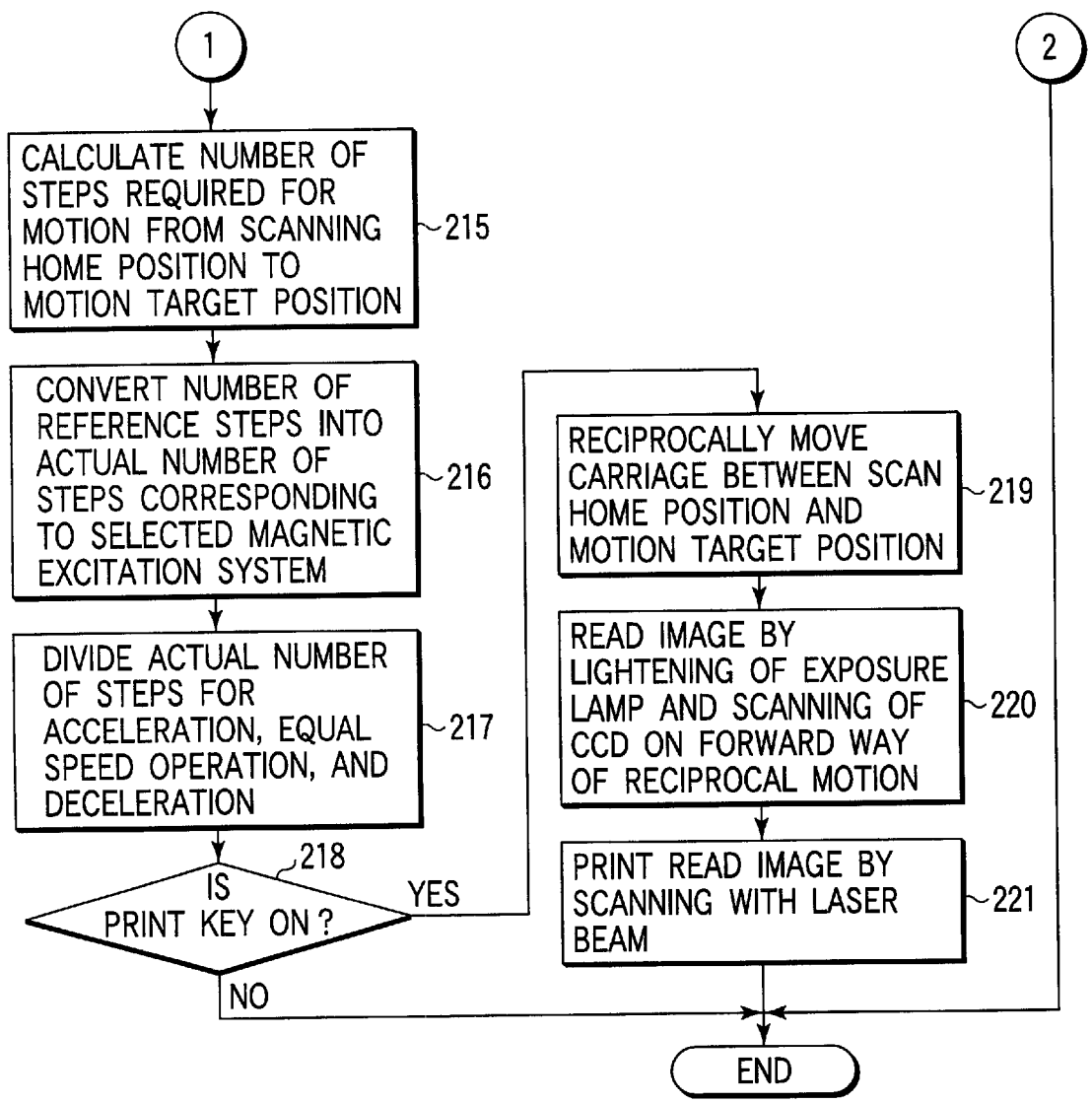

Next, functions and effects will be explained with reference to the flowcharts shown in FIGS. 9A and 9B.

Which of "25 to 47%", "48 to 95%", "96 to 194%", and "195 to 400%" is the copy magnification specified by the key input section 81 is determined (steps 201, 202, and 203). In case where the copy magnification is "25 to 47%" (YES in the step 201), the magnetic excitation system A is selected (step 204). In case where the copy magnification is "48 to 95%" (NO in the step 201 and YES in the step 202), the magnetic excitation system B is selected (step 205). In case where the-copy magnification is "96 to 194%" (NO in the step 201, NO in the step 202, and YES in the step 203), the magnetic excitation system C is selected (step 206). In case where the copy magnification is "195 to 400%" (NO in the step 201, NO in the step 202, and NO in the step 203), the magnetic excitation system D is selected (step 207).

As indicated by the selection conditions in FIG. 7, the rotation angle of the scanning motor 57 corresponding to one step is set to "0.72° ", according to the magnetic excitation system A. The rotation angle of the scanning motor 57 corresponding to one step is set to "0.36° ", according to the magnetic excitation system B. The rotation angle of the scanning motor 57 corresponding to one step is set to "0.288° ", according to the magnetic excitation system C. The rotation angle of the scanning motor 57 corresponding to one step is set to "0.09° ", according to the magnetic excitation system D. That is, as the larger copy magnification increases, a greater rotation angle of the scanning motor 57 corresponding to one step is set so that the motion speed of the carriage 4 is lowered.

Figure 10:
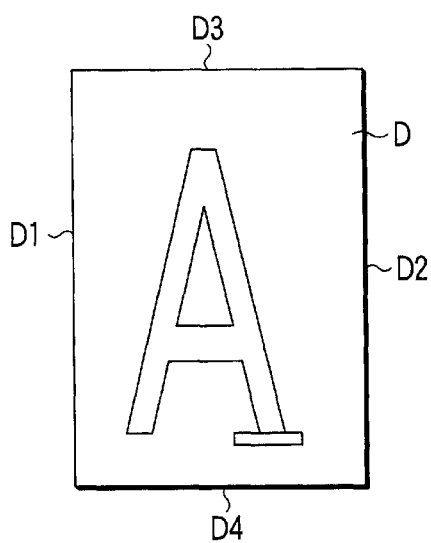
FIG. 10 is a view showing an example of an original document used in the first and second embodiments.

FIG. 10 shows an example of an original document D on which an image such as a character "A" is written on its surface. D1 denotes the left end, D2 denotes the right end, D3 denotes the upper end, and D4 denotes the lower end. This original document D is set on the original document table 2 with its surface oriented downward. This setting status and the size of the original document D are detected by each document sensor 11 (YES in the step 208 and step 209).

Figure 11:
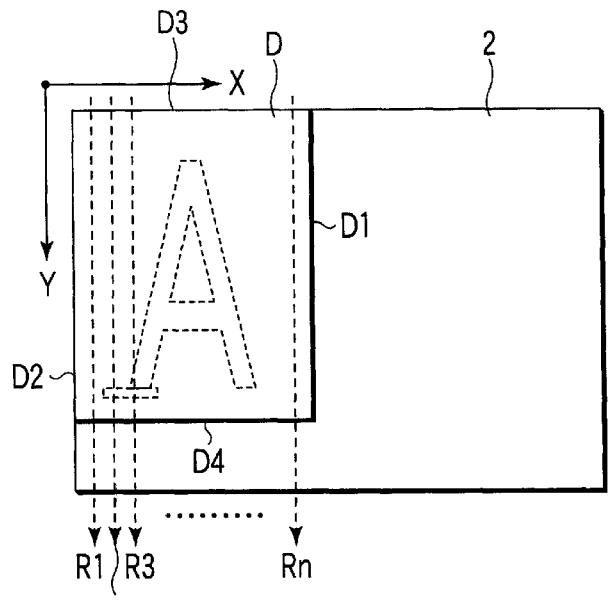
FIG. 11 is a view showing a state of the original document shown in FIG. 10, which is set on the document table, and main scanning and sub-scanning for reading an image in a normal print mode.

If the normal print mode for printing the image of the original document D in a reversed state is specified by the key input section 81 (NO in the step 210), the reference position 2b with which the original document should be aligned is set as a start end position for image reading in the regular direction of the sub-scanning (step 211). Further, in the regular direction X of the sub-scanning, a predetermined position including the document size detected by each document sensor 11, i.e., a position which exceeds the lateral width between D2 and D1 shown in FIG. 11 is set as a finish end position of the image reading (step 212).

A scanning home position is set at a position at a predetermined distance (necessary for acceleration of the carriage 4) from the start end position set as described above in the more proximal end side in the regular direction X of the sub-scanning (step 213). A motion target position of the carriage 4 is set at a position at a predetermined distance (necessary for deceleration of the carriage 4) from the finish end position set as described above in the distal side in the regular direction X of the sub-scanning (step 214). Note that distances necessary for acceleration and deceleration of the carriage 4 are set variably in correspondence with the copy magnification.

The number of reference steps necessary to move the carriage 4 from the scanning home position to the motion target position is calculated (step 215). The number of reference steps thus calculated is converted into an actual number of steps according to the magnetic excitation system selected as described previously (step 216). The actual number of steps is divided for acceleration, equal-speed operation, and deceleration (step 217).

When the print key 83 is turned on (YES in the step 218), the carriage 4 is moved to the scanning home position, and the scanning motor 57 is driven on the basis of the actual number of steps. By this driving, the carriage 4 is reciprocally moved between the scanning home position and the motion target position (step 219).

On the forward way of the reciprocal motion of the carriage 4 (exposure lamp 5), the exposure lamp 5 is lightened so that the surface of the original document D is exposed from the right end D2 toward the left end D1. Reflection light from the original document D is projected on the CCD 10. Line scanning on the light receiving area is repeated on the CCD 10, thereby to read an image of the original document D (step 220). Repetitions of line scanning on the CCD 10 correspond respectively to the main scanning operations R1, R2, . . . Rn on the original document D in one direction Y, as shown in FIG. 11. The main scanning operations R1, R2, . . . Rn shift in the direction X (the regular direction of the sub-scanning) perpendicular to the one direction Y, as the exposure lamp 5 moves on the forward way of the reciprocal motion.

The read image is printed on a copying paper C through the photosensitive drum 20 by scanning on the photosensitive drum 20 with the laser beam B emitted from the laser unit 27 (step 221).

Figure 12:
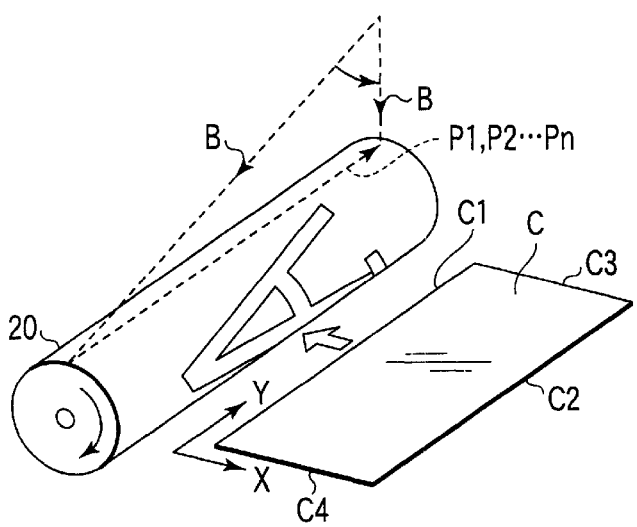
FIG. 12 is a view showing a state in which an image read in FIG. 11 is printed on a copying paper by a laser beam and a photosensitive drum.

That is, the laser beam B modulated on the basis of the read image is emitted from the laser unit 27. As shown in FIG. 12, this laser beam B is swung in the axis direction of the photosensitive drum 20, thereby to repeat line scanning on the surface of the photosensitive drum 20. By this repetition of line scanning and rotation of the photosensitive drum 20, an electrostatic latent image is formed on the surface of the photosensitive drum 20. This electrostatic latent image corresponds to a reversed image of the character "A" on the original document D. This electrostatic latent image is developed to form a visual image which is transferred to a copying paper C. On the copying paper C, C1 denotes its left end, C2 denotes its right end, C3 denotes its upper end, and C4 denotes its lower end.

Figure 13:
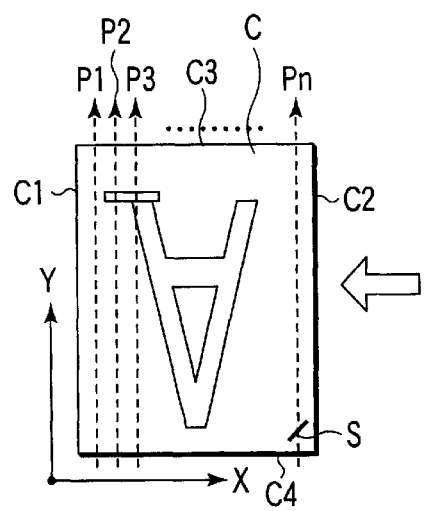
FIG. 13 is a view showing a state in which the image read in FIG. 11 is printed on a copying paper, and main scanning and sub-scanning of the printing.

Repetitions of line scanning with the laser beam B correspond respectively to main scanning operations P1, P2, . . . Pn in one direction Y on the copying paper C, as shown in FIG. 13. These main scanning operations P1, P2, . . . Pn shift in the direction X (which is the regular direction of the sub-scanning) perpendicular to the one direction Y, i.e., in the direction from the left end C1 to the right end C2 of the copying paper C.

Thus, the image of the original document D, which is not reversed, is printed on the copying paper C. The printed copying paper C is fed to the sorter 44. If a plurality of printed copying papers C are layered and stapled, the staple unit 46 operates to perform stapling S at a specific position on each copying paper C, as shown in FIG. 13. The specific position is a corner part existing between the right end C2 and the lower end C4 of each copying paper C and is situated at an upper left position where it is viewed with respect to the printed image taken as a reference.

Next, explanation will be made of a mirror image print mode in which the image of the original document D is printed, reversed.

An original document D is set on the document table 2 with its surface oriented downward like in the normal mode. This setting status and the size of the original document D are detected by each document sensor 11 (YES in step 208 and step 209).

Figure 14:
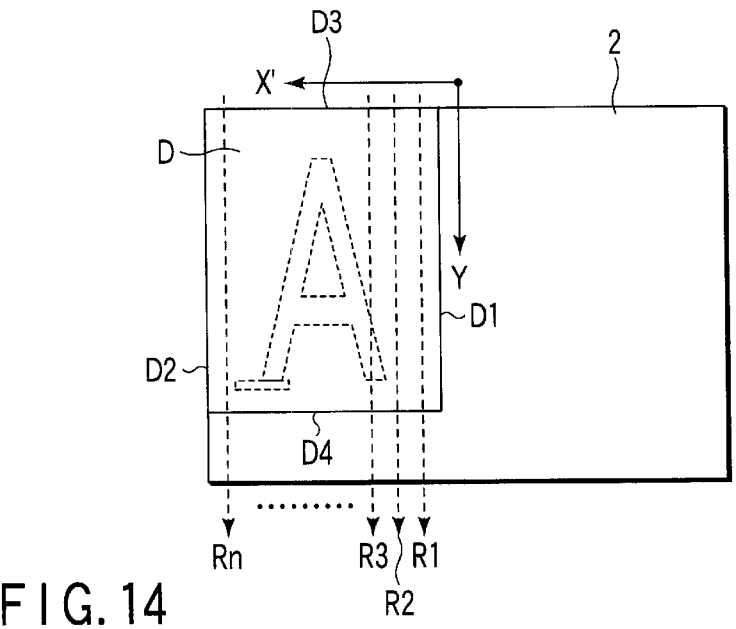
FIG. 14 is a view showing a state in which the original document shown in FIG. 10 is set on the document table, and main scanning and sub-scanning on the original document in image reading in a mirror image print mode.

If a mirror print mode is specified by the key input section 81 (YES in step 210), a predetermined position which includes the document size detected by each document sensor 11, i.e., a position exceeding the lateral width between D2 and D1 shown in FIG. 14 is set as a start end position for image reading (step 222). Further, a reference position 2b for document setting is set as a finish end position of image reading in the reverse direction X' of the sub-scanning (step 223).

A scanning home position is set at a position at a predetermined distance (necessary for acceleration of the carriage 4) from the start end position set as described above, in the more proximal side in the reverse direction X' of the sub-scanning (step 224). A motion target position of the carriage 4 is set at a position at a predetermined distance (necessary for deceleration of the carriage 4) from the finish end position set as described above in the distal side in the reverse direction X' of the sub-scanning (step 225). Note that distances necessary for acceleration and deceleration of the carriage 4 are set variably in correspondence with the copy magnification.

The number of reference steps necessary to move the carriage 4 from the scanning home position to the motion target position is calculated (step 215). The number of reference steps thus calculated is converted into an actual number of steps according to the magnetic excitation system selected as described previously (step 216). The actual number of steps is divided for acceleration, equal-speed operation, and deceleration (step 217).

When the print key 83 is turned on (YES in the step 218), the carriage 4 is moved to the scanning home position, and the scanning motor 57 is driven on the basis of the actual number of steps. By this driving, the carriage 4 is reciprocally moved between the scanning home position and the motion target position (step 219).

On the forward way of the reciprocal motion of the carriage 4 (exposure lamp 5), the exposure lamp 5 is lightened so that the surface of the original document D is exposed from the left end D1 toward the right end D2. Reflection light from the original document D is projected on the CCD 10. Line scanning on the light receiving area is repeated on the CCD 10, thereby to read an image of the original document D (step 220).

Repetitions of line scanning on the CCD 10 correspond respectively to the main scanning operations R1, R2, . . . Rn on the original document D in one direction Y, as shown in FIG. 14. The main scanning operations R1, R2, . . . Rn shift in the direction X' (the reverse direction of the sub-scanning) perpendicular to the one direction Y, as the exposure lamp 5 moves on the forward way of the reciprocal motion.

The read image is printed on a copying paper C through the photosensitive drum 20 by scanning on the photosensitive drum 20 with the laser beam B emitted from the laser unit 27 (step 221).

Figure 15:
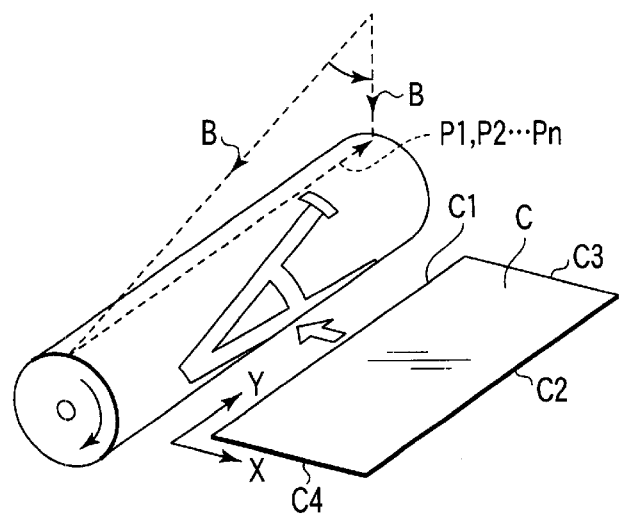
FIG. 15 is a view showing a state in which the image read in FIG. 14 is printed onto a copying paper by a laser beam and a photosensitive drum.

That is, the laser beam B modulated on the basis of the read image is emitted from the laser unit 27. As shown in FIG. 15, this laser beam B is swung in the axis direction of the photosensitive drum 20, thereby to repeat line scanning on the surface of the photosensitive drum 20. By.this repetition of line scanning and rotation of the photosensitive drum 20, an electrostatic latent image is formed on the surface of the photosensitive drum 20. This electrostatic latent image is not reversal of the character "A" on the original document D but directly corresponds to the image of the character. This electrostatic latent image is developed to form a visual image which is transferred to a copying paper C.

Figure 16:
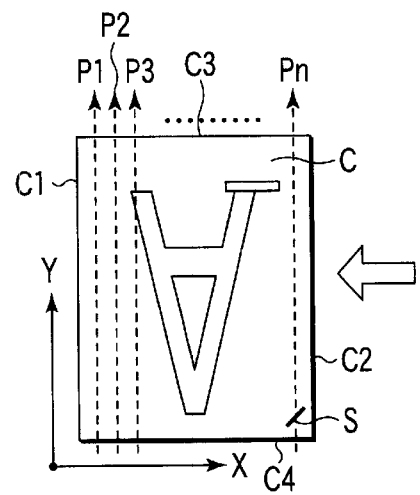
FIG. 16 is a view showing a state in which the image read in FIG. 14 is printed onto a copying paper and main scanning and sub-scanning of the printing.
Figure 17:
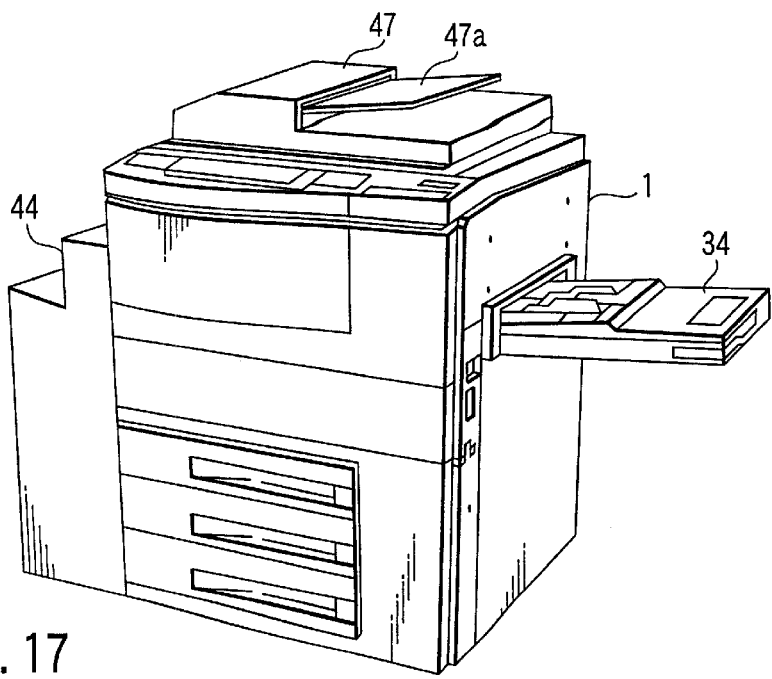
FIG. 17 is a view showing an outer appearance of the second embodiment.
Figure 18:
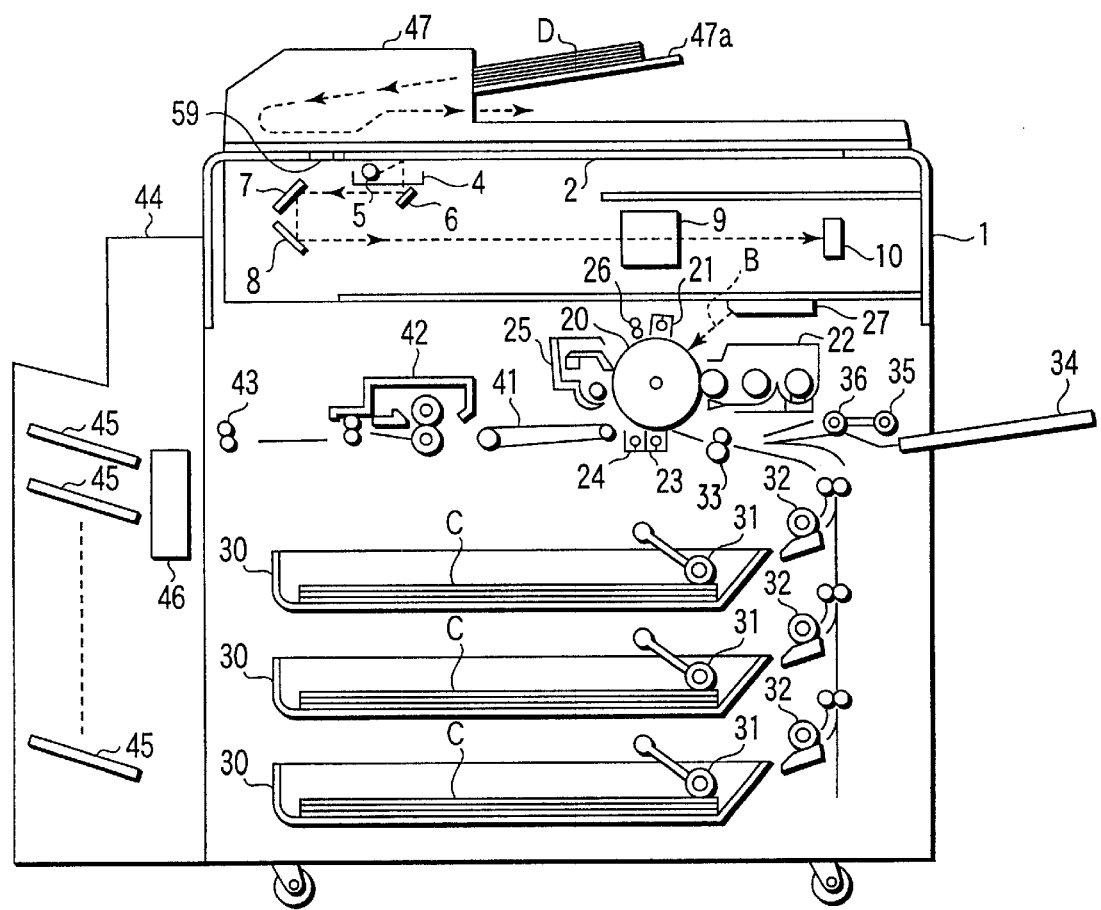
FIG. 18 is a view showing the internal structure of the second embodiment.

Repetitions of line scanning with the laser beam B correspond respectively to main scanning operations P1, P2, . . . Pn in one direction Y on the copying paper C, as shown in FIG. 16. These main scanning operations P1, P2, . . . Pn shift in the direction X (which is the regular direction of the sub-scanning) perpendicular to the one direction Y, i.e., in the direction from the left end C1 to the right end C2 of the copying paper C.

Thus, the image of the original document D is printed, as a mirror image which is reversal of the original image, on the copying paper C. The printed copying paper C is fed to the sorter 44. If a plurality of printed copying papers C are layered and stapled, the staple unit 46 operates to perform stapling S at a specific position on each copying paper C, as shown in FIG. 16. Like the normal print mode, the specific position is a corner part existing between the right end C2 and the lower end C4 of each copying paper C and is situated at an upper left position where it is viewed with respect to the printed image taken as a reference.

As described above, in printing in the mirror-image print mode, the direction of sub-scanning for reading an image is switched to the reverse direction X' which is opposite to the sub-scanning direction in the normal print mode. In this manner, the image on the original document D can be printed as a mirror image without requiring a memory or an image processing function for reversal. That is, even an image forming apparatus of a low-cost type which cannot be equipped. with a memory or an image processing function for reversal can achieve printing in the mirror image print mode.

In addition, the position of the staple S stapling S with respect to each copying paper C can be set in common to the cases of the normal print mode and the mirror image print mode. That is, both in the normal and mirror mode print modes, stapling S can be performed always at a proper position in relation to an image to be printed, as a reference.

[2] The second embodiment of the present invention will now be explained with reference to the drawings. In the drawings, the same parts as those of the first embodiment will be denoted at the same reference symbols as those of the first embodiment, and detailed explanation thereof will be omitted herefrom.

As shown in FIGS. 17, 18, 19, and 20, an automatic document feeder (ADF) 47 is provided to be openable/closable on the document table 2. The automatic document feeder 47 has a tray 47a where an original document is set. The feeder 47 feeds a plurality of sheets of an original document D, one after another, to a document read window 59, and lets them pass through the window. Further, each sheet of the original document D which has passed there is discharged to the lower surface side of the tray 47a.

The document read window 59 is made of transparent glass and is provided adjacent to the indicator part 2a. The carriage 4 can move to a position corresponding to the document read window 59 and can stop there. At the same time when the carriage 4 stops at that position, the automatic document feeder 47 operates and the exposure lamp 5 is lightened, so that the original document D which passes over the document read window 59 is exposed through the document read window 59. Reflection light from the original document D is projected onto the CCD 10 by the reflection mirrors 6, 7, and 8 and the magnification change lens block 9.

The carriage 4, exposure lamp 5, reflection mirrors 6, 7, and 8, magnification change lens block 9, and CCD 10 construct a second read means for optically reading the original document D which passes over the document read window 59. That is, the original document D which is passing over the document read window 59 is subjected to optical main-scanning in one direction, and the main scanning is repeated as the original document passes over. Repetitions of the main scanning in accordance with passing of the original document D are called sub-scanning. FIG. 19 shows a case where the direction of the main scanning is Y and the direction of the sub-scanning is X.

Meanwhile, a first read means for optically reading an original document D set on the document table 2 is constructed by the carriage 4, exposure lamp 5, reflection mirrors 6, 7, and 8, magnification change lens block 9, and CCD 10. That is, the original document D set on the document table 2 is subjected to optical main scanning in one direction, and the main scanning is repeated in accordance with the motion of the exposure lamp 5 on the forward way of its reciprocal motion. Repetition of the main scanning according to the motion of the exposure lamp on the forward way of its reciprocal motion is taken as sub-scanning. The main scanning direction Y and the sub-scanning direction X are the same as those of the second read means.

Figure 21:
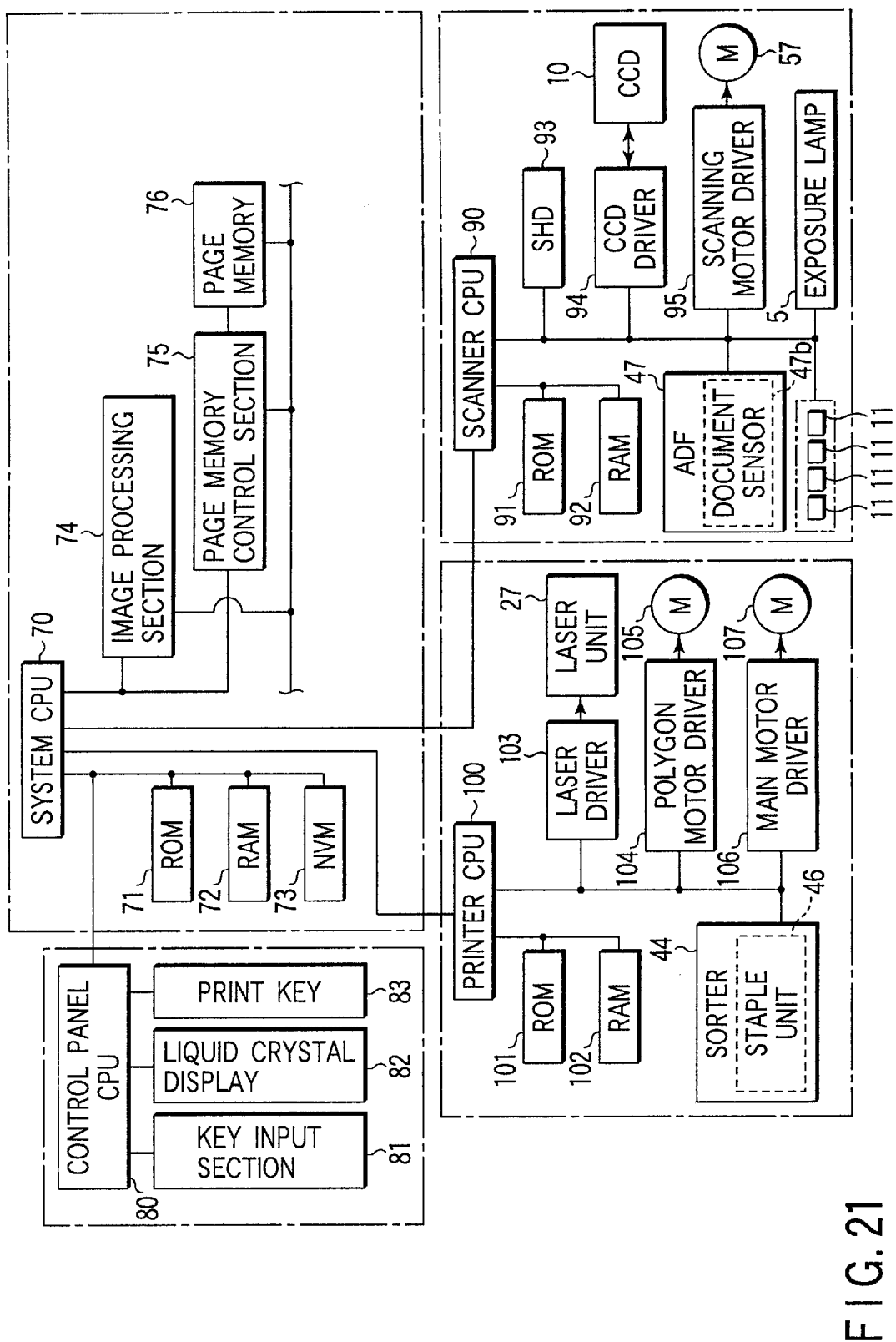
FIG. 21 is a block diagram of a control circuit in the second embodiment.

FIG. 21 shows a total control circuit.

The system CPU 70 is connected with a page memory control part 75, which is connected with a page memory 76.

The scanner CPU 90 is-connected with the automatic document feeder 47. The automatic document feeder 47 comprises a document sensor 47b for detecting presence or absence and an original document D on the tray 47a and the size thereof if any.

The system CPU 70 and the scanner CPU 90 has the following control means (11) and (12) as its main functions.

(11) A first control means for letting the first read means function to set the sub-scanning direction of the first read means in the normal direction (regular direction X) in case of the normal print mode in which the image of an original document D set on the document table 2 is printed on a copying paper C, not reversed, and for letting the first read means function to switch the sub-scanning direction of the first read means to the direction (reverse direction X') opposite to the normal direction in case of the mirror print mode in which the image of an original document set on the document table 2 is printed on a copying paper C, reversed as a mirror image.

(12) A second control means for letting the second read means function in case of the mirror image print mode in which the image of an original document set on the automatic document feeder 47 is printed on a copying paper C, reversed.

The other points of its structure are the same as those of the first embodiment.

The functions and effects thereof will now be explained.

With respect to printing of a document table reading system in which printing is carried out with an original document D is set on the document table 2, the functions are the same as those of the first embodiment, and therefore, detailed explanation thereof will be omitted herefrom.

Figure 22:
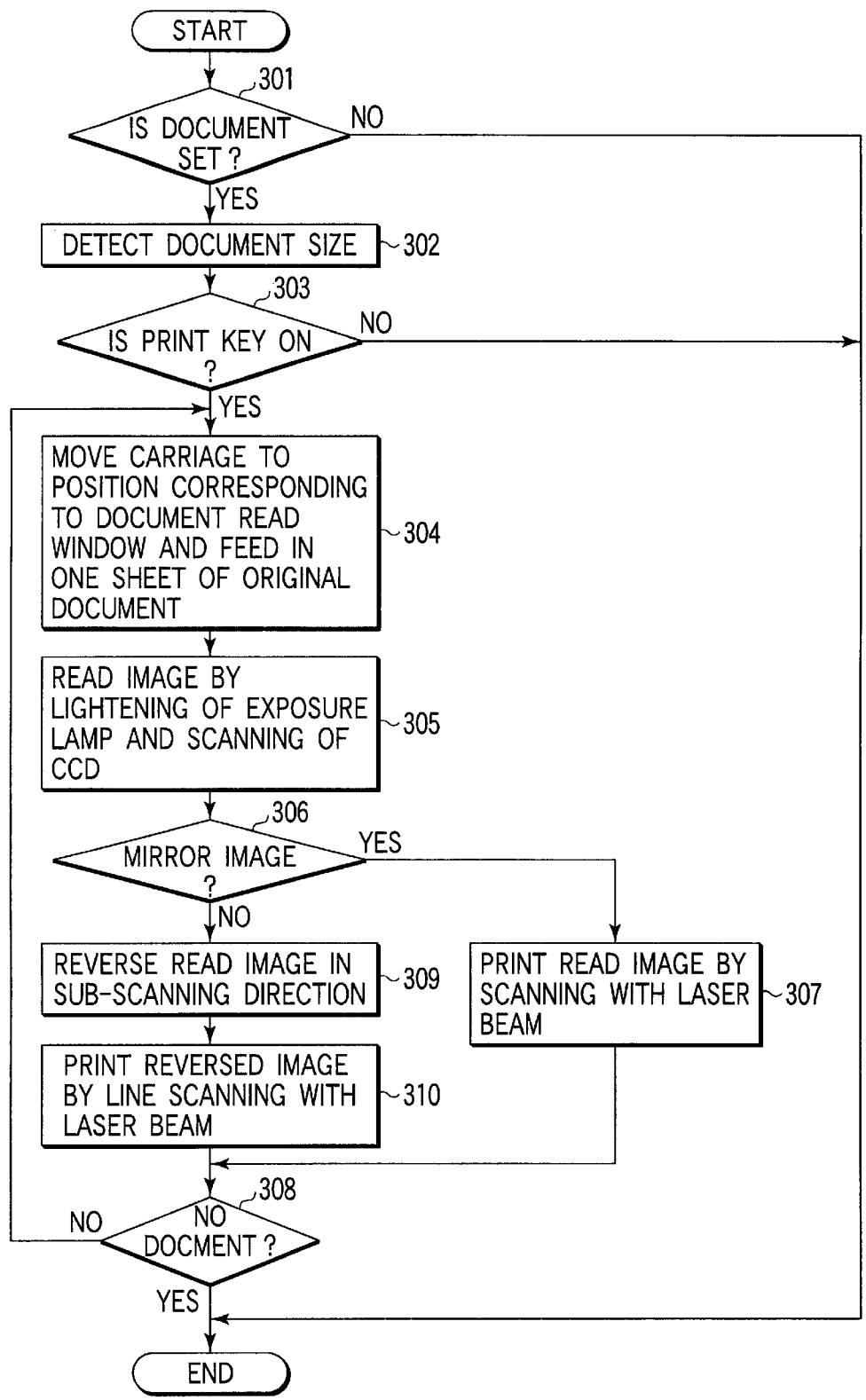
FIG. 22 is a flowchart for explaining functions of the sheet through system in the second embodiment.

In the following, with reference to the flowchart shown in FIG. 22, explanation will be made of printing according to a sheet-through reading system in which printing is carried out with the original document D set on the automatic document feeder 47.

One or a plurality of sheets of an original document D are set on the tray 47a of the automatic document feeder 47 with their surfaces oriented upward. This setting status and size of the original document D are detected by the document sensor 47b of the automatic document feeder 47 (YES in the step 301 and the step 302).

When the print key 83 is turned on (YES in the step 303), the carriage 4 is moved to a position corresponding to the document read window 59 and one sheet of the original document D is fed to the document read window 59 by the automatic document feeder 47 (step 304). The fed sheet of original document D passes over the document read window 59 with its surface facing toward the document read window 59. The original document D which has passed over is discharged to the lower surface side of the tray 47a of the automatic document feeder 47.

When the original document D passes over the document read window 59, the surface of the original document D is exposed by the lightened exposure lamp 5. At this time, exposure shifts from the left end D1 of the original document D to the right end D2 thereof. Reflection light from the original document D by this exposure is projected on the CCD 10. The CCD 10 repeats line scanning on the light receiving area, thereby to read an image of the original document D (step 305). Repetitions of the line scanning by the CCD 10 respectively correspond to main scanning operations R1, R2, . . . Rn in one direction Y of the original document D. These main scanning operations R1, R2, . . . Rn shift in the direction X' (the reverse direction of the sub-scanning) perpendicular to the direction Y as the original document D passes over.

If the mirror image print mode is specified by the key input part 81 (YES in step 306), the read image is printed through the photosensitive drum 20 by the scanning on the photosensitive drum 20 with the laser beam B emitted from the laser unit 27 (step 307).

That is, the laser beam B modulated on the basis of the read image is emitted from the laser unit 27. As shown in FIG. 25, this laser beam B is swung in the axis direction of the photosensitive drum 20, thereby to repeat line scanning on the surface of the photosensitive drum 20. By this repetition of line scanning and rotation of the photosensitive drum 20, an electrostatic latent image is formed on the surface of the photosensitive drum 20. This electrostatic latent image is not reversal of the image of the character "A" on the original document D but directly corresponds to the image. This electrostatic latent image is developed to form a visual image which is transferred to a copying paper C.

Repetitions of line scanning with the laser beam B correspond respectively to main scanning operations P1, P2, . . . Pn in one direction Y on the copying paper C, as shown in FIG. 26. As the copying paper is fed, the main scanning operations P1, P2, . . . Pn shift in the direction X (which is the regular direction of the sub-scanning) perpendicular to the one direction Y, i.e., in the direction from the left end C1 to the right end C2 of the copying paper C.

Thus, the image of the original document D is reversed and printed on the copying paper C. The printed copying paper C is fed to the sorter 44.

If there is any sheet of the original document D remaining on the automatic document feeder 47 (NO in the step 308), the processes of the steps 304, 305, 306, and 307 are repeated. When no sheet of the original document D remains on the automatic document feeder (YES in the step 308), the printing ends.

As described above, in the mirror image print mode according to the sheet-through read system, the image of an original document D is read from the left end D1 to the right end D2, and therefore, a mirror image thereof can be formed on a copying paper C by directly printing the read image without reversing it.

If a plurality of printed copying papers C are layered and stapled, the staple unit 46 operates to perform stapling S at a specific position on each copying paper C, as shown in FIG. 26. The specific position is a corner part existing between the right end C2 and the lower end C4 of each copying paper C and is situated at an upper left position where it is viewed with respect to the printed image taken as a reference, like in the normal print mode and the mirror image print mode according to the document table read system.

Otherwise, if the normal print mode is specified by the key input part 81 (NO in the step 306), the read image is reversed in the sub-scanning direction by the page memory 76.

Figure 27:
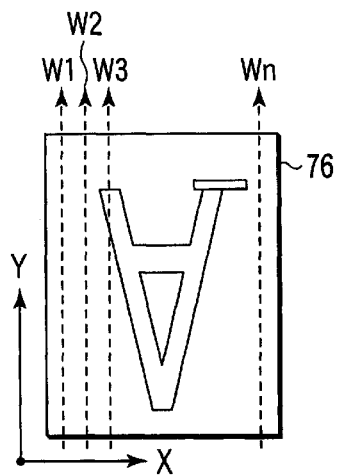
FIG. 27 is a view showing a state in which the image read in FIG. 24 is written into a page memory in case of a normal print mode.
Figure 28:
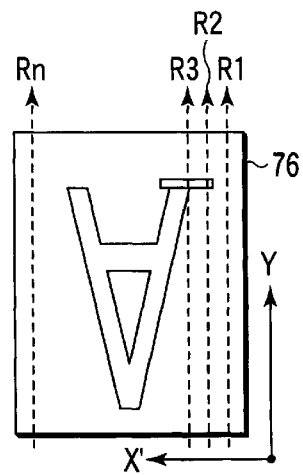
FIG. 28 is a view showing a state in which an image is read from the memory shown in FIG. 27.

That is, the read image is once stored into the page memory 76 by write scanning operations W1, W2, . . . Wn repeated in the regular direction X of the sub-scanning, as shown in FIG. 27. Further, the image thus stored in the page memory 76 is read by the read scanning operations R1, R2, . . . Rn repeated in the reverse direction X' of the sub-scanning, as shown in FIG. 28.

The read image, which is a reversed image, is printed on a copying paper C through the photosensitive drum 20 by scanning on the photosensitive drum 20 with the laser beam B emitted from the laser unit 27 (step 310).

Figure 29:
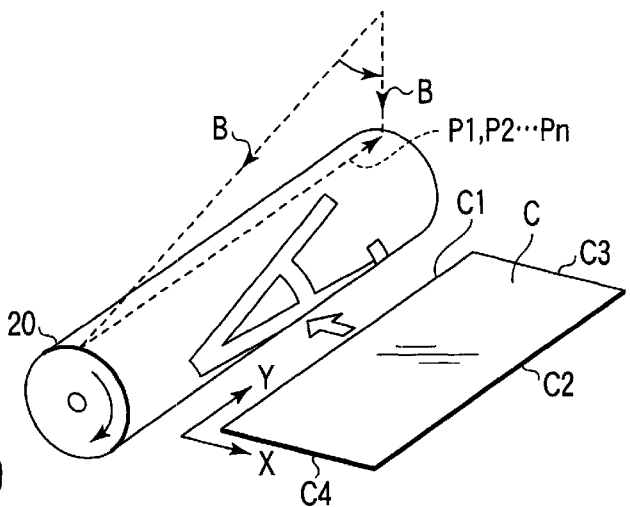
FIG. 29 is a view showing a state in which the image read in FIG. 28 is printed on a copying paper by a laser beam and a photosensitive drum.

That is, the laser beam B modulated on the basis of the read image is emitted from the laser unit 27. As shown in FIG. 29, this laser beam B is swung in the axis direction of the photosensitive drum 20, thereby to repeat line scanning on the surface of the photosensitive drum 20. By this repetition of line scanning and rotation of the photosensitive drum 20, an electrostatic latent image is formed on the surface of the photosensitive drum 20. This electrostatic latent image is an image corresponding to reversal of the image of the character "A" on the original document D. This electrostatic latent image is developed to form a visual image which is transferred to a copying paper C.

Figure 30:
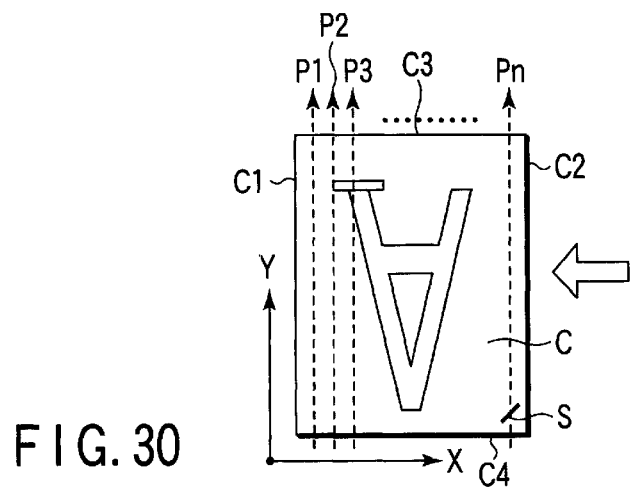
FIG. 30 is a view showing a state in which an image is printed on the copying paper shown in FIG. 29, and main scanning and sub-scanning of the printing.

Repetitions of line scanning with the laser beam B correspond respectively to main scanning operations P1, P2, . . . Pn in one direction Y on the copying paper C, as shown in FIG. 30. As the copying paper is fed, the main scanning operations P1, P2, . . . Pn shift in the direction X (which is the regular direction of the sub-scanning) perpendicular to the one direction Y, i.e., in the direction from the left end C1 to the right end C2 of the copying paper C.

Thus, the image of the original document D, which is not reversed, is printed on the copying paper C. The printed copying paper C is fed to the sorter 44.

If there is any sheet of the original document D remaining on the automatic document feeder 47 (NO in the step 308), the processes of the steps 304, 305, 306, 309, and 310 are repeated. When no sheet of the original document D remains on the automatic document feeder 47 (YES in the step 308), the printing ends.

If a plurality of printed copying papers C are layered and stapled, the staple unit 46 operates to perform stapling S at a specific position on each copying paper C, as shown in FIG. 30. The specific position is a corner part existing between the right end C2 and the lower end C4 of each copying paper C and is situated at an upper left position where it is viewed with respect to the printed image taken as a reference, like in the normal print mode and the mirror image print mode in which printing is carried out with the original document D set on the document table 2, and also like in the mirror image print mode in which printing is carried out with the original document D set on the automatic document feeder 47.

As described above, in the normal print mode according to the sheet-through read system, processing for reversing a read image by the page memory is required. However, with respect to the mirror image print mode according to the document table read system and the mirror image print mode according to the sheet through read system, printing can be easily completed without necessitating the reversal processing by the page memory 76. Accordingly, the image processing can be simplified so that the present invention is applicable to an image forming apparatus of a low cost type.

In addition, the position of the stapling S with respect to each copying paper C can be set in common to all modes in the cases of the normal print mode and the mirror image print mode according to the document table read system, as well as both modes according to the sheet-through read system. Therefore, regardless of differences between the read systems and between print modes, stapling S can be performed always at a proper position in relation to an image to be printed, as a reference.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:

a document table on which an original document is set;

a read section which reads an image of the original document set on the document table and includes an exposure section which is capable of making reciprocal motion and exposes the original document set on the document table and an image signal output section which receives reflection light caused by exposure by the exposure section from the original document performs main scanning on a light receiving area thereof, and performs sub-scanning in which the main scanning is repeated as the exposure section moves on a forward way of the reciprocal motion thereof, thereby to output an image signal corresponding to the image of the original document;

a printer section which executes main scanning and sub-scanning in synchronization with the main scanning and the sub-scanning performed by the read section, thereby to print the image read by the read section, onto an image forming medium; and a control section which sets the direction of the sub-scanning of the read section to a normal direction, in case of a normal print mode, and which sets the direction of the sub-scanning to a direction opposite to the normal direction, in case of a mirror image print mode.

2. The apparatus according to claim 1, wherein the read section includes an exposure lamp which exposes the original document set on the document table, a carriage which lets the exposure lamp make reciprocal motion along the document table, and a CCD which receives reflection light caused by exposure by the exposure lamp from the original document, which performs main scanning on a light receiving area thereof, and which performs sub-scanning in which the main scanning is repeated as the exposure lamp moves on a forward way of the reciprocal motion, thereby to output an image signal corresponding to the image of the original document.

3. The apparatus according to claim 1, wherein the printer section includes a photosensitive drum, a laser unit which performs main scanning on a surface of the photosensitive drum with a laser beam, in one direction, and sub-scanning in which the main scanning is repeated in accordance with rotation of the photosensitive drum, thereby to form an electrostatic latent image corresponding to the image read by the read section, on the surface of the photosensitive drum, a developing device which develops the electrostatic latent image formed on the surface of the photosensitive drum, thereby to visualize the electrostatic latent image, and a transfer device which transfers a visualized image on the surface of the photosensitive drum, to the image forming medium.

4. The apparatus according to claim 1, wherein the control section sets a direction of the reciprocal motion of the exposure section to the normal direction, in case of the normal print mode, and switches the direction of the reciprocal motion of the exposure section to a direction opposite to the normal direction, in case of the mirror image print mode.

5. The apparatus according to claim 1, wherein the read section includes an exposure lamp which exposes the original document set on the document table, a carriage which lets the exposure lamp make reciprocal motion along the document table, and a CCD which receives reflection light caused by exposure by the exposure lamp from the original document, which performs main scanning on a light receiving area thereof, and which performs sub-scanning in which the main scanning is repeated as the exposure lamp moves on a forward way of the reciprocal motion, thereby to output an image signal corresponding to the image of the original document, and the control section sets a direction of the reciprocal motion of the exposure lamp to the normal direction, in case of the normal print mode, and switches the direction of the reciprocal motion of the exposure lamp to a direction opposite to the normal direction, in case of the mirror image print mode.

6. The apparatus according to claim 1, further comprising a staple unit which performs stapling at a predetermined position of the image forming medium on which the image has been printed by the printer section.

7. An image forming apparatus comprising:
a document table on which an original document is set;
a document read window;
a document feeder which feeds the original document, which is set, onto the document read window and which lets the original document pass over the document read window;
a first read section which performs optical main scanning on the original document set on the document table, in one direction, and sub-scanning in which the main scanning is shifted in a direction perpendicular to the one direction, thereby to read an image of the original document set on the document table;
a second read section which performs main scanning on the original document, which passes through the document read window, and sub-scanning in which the main scanning is repeated as the original document passes over the document read window, thereby to read the image of the original document which passes over the document read window;
a printer section which performs main scanning and sub-scanning in synchronization with the main scanning and sub-scanning performed by the first and second read sections, thereby to print an image, which is read by the first and second read sections, to an image forming medium;
a first control section which lets the first read section function to set a direction of the sub-scanning of the first read section to a normal direction, in case of a normal print mode, and which lets the first read section function to switch the direction of the sub-scanning of the first read section to a direction opposite to the normal direction, in case of a first mirror image print mode; and
a second control section which lets the second read section function in case of a second mirror image print mode in which the image of the original document set on the document feeder is printed on the image forming medium, with the image of the original document reversed.

8. The apparatus according to claim 7, wherein the first read section includes an exposure section capable of making reciprocal motion, which exposes the original document set on the document table, and an image signal output section which receives reflection light caused by exposure by the exposure section from the original document, which performs main scanning on a light receiving area thereof, and which performs sub-scanning in which the main scanning is repeated as the exposure section moves on a forward way of the reciprocal motion thereof, thereby to output an image signal corresponding to the image of the original document.

9. The apparatus according to claim 7, wherein the second read section includes an exposure section which exposes the original document which passes over the document read window, and an image signal output section which receives section from the original document, which performs main scanning on a light receiving area thereof, and which performs sub-scanning in which the main scanning is repeated as the original document passes over the document read window, thereby to output an image signal corresponding to the image of the original document.

10. The apparatus according to claim 7, wherein the first read section includes an exposure lamp which exposes the original document set on the document table, a carriage which lets the exposure lamp make reciprocal motion along the document table, and a CCD which receives reflection light caused by exposure by the exposure lamp from the original document, which performs main scanning on a light receiving area thereof, and which performs sub-scanning in which the main scanning is repeated as the exposure lamp moves on a forward way of the reciprocal motion, thereby to output an image signal corresponding to the image of the original document.

11. The apparatus according to claim 7, wherein the second read section includes an exposure lamp which exposes the original document which passes over the document read window, and a CCD which receives reflection light caused by exposure by the exposure lamp from the original document, which performs main scanning on a light receiving area thereof, and which performs sub-scanning in which the main scanning is repeated as the original document passes over the document read window, thereby to output an image signal corresponding to the image of the original document.

12. The apparatus according to claim 7, wherein the printer section includes a photosensitive drum, a laser unit which performs main scanning on a surface of the photosensitive drum with a laser beam, in one direction, and sub-scanning in which the main scanning is repeated in accordance with rotation of the photosensitive drum, thereby to form an electrostatic latent image corresponding to the image read by the first and second read sections, on the surface of the photosensitive drum, a developing device which develops the electrostatic latent image formed on the surface of the photosensitive drum, thereby to visualize the electrostatic latent image, and a transfer device which transfers a visualized image on the surface of the photosensitive drum, to the image forming medium.

13. The apparatus according to claim 7, wherein the first read section includes an exposure section capable of making reciprocal motion, which exposes the original document set on the document table, and an image signal output section which receives reflection light caused by exposure by the exposure section from the original document, which performs main scanning on a light receiving area thereof, and which performs sub-scanning in which the main scanning is repeated as the exposure section moves on a forward way of the reciprocal motion thereof, thereby to output an image signal corresponding to the image of the original document, and the first control section sets a direction of the reciprocal motion of the exposure section to the normal direction, in case of the normal print mode, and switches the direction of the reciprocal motion of the exposure section to a direction opposite to the normal direction, in case of the first mirror image print mode.

14. The apparatus according to claim 7, wherein the first read section includes an exposure lamp which exposes the original document set on the document table, a carriage which lets the exposure lamp make reciprocal motion along the document table, and a CCD which receives reflection light caused by exposure by the exposure lamp from the original document, which performs main scanning on a light receiving area thereof, and which performs sub-scanning in which the main scanning is repeated as the exposure lamp moves on a forward way of the reciprocal motion, thereby to output an image signal corresponding to the image of the original document, and the first control section sets a direction of the reciprocal motion of the exposure lamp to the normal direction, in case of the normal print mode, and switches the direction of the reciprocal motion of the exposure lamp-to a direction opposite to the normal direction, in case of the first mirror image print mode.

15. The apparatus according to claim 7, further comprising a staple unit which performs stapling at a specific position on the image forming medium on which the image has been printed by the printer section.

* * * * *